(12) United States Patent
Satoski

(10) Patent No.: US 7,328,564 B2
(45) Date of Patent: Feb. 12, 2008

(54) TRAILER SECTION PIVOTING ABOUT LATERAL AXIS AND FORE-AFT AXIS RELATIVE TO MOWER HAVING VACUUM SYSTEM

(76) Inventor: Donald J. Satoski, 5171 W. U.S. 6, Union Mills, IN (US) 46382

( * ) Notice: Subject to any disclaimer, the term of this patent is extended or adjusted under 35 U.S.C. 154(b) by 0 days.

(21) Appl. No.: 11/680,015

(22) Filed: Feb. 28, 2007

(65) Prior Publication Data

US 2007/0193239 A1    Aug. 23, 2007

Related U.S. Application Data

(63) Continuation-in-part of application No. 10/907,785, filed on Apr. 15, 2005, now abandoned.

(60) Provisional application No. 60/521,387, filed on Apr. 15, 2004.

(51) Int. Cl.
  *A01D 43/00* (2006.01)
  *A01D 43/06* (2006.01)

(52) U.S. Cl. .................... 56/202; 56/205; 280/489

(58) Field of Classification Search ............... 56/202, 56/200, 203, 204, 205, 199, 16.6, 320.2; 280/480, 460.1, 416.1
See application file for complete search history.

(56) References Cited

U.S. PATENT DOCUMENTS

| | | | | |
|---|---|---|---|---|
| 3,351,384 A | * | 11/1967 | Huck | 298/26 |
| 3,496,977 A | * | 2/1970 | Gifford | 56/16.6 |
| 4,310,998 A | * | 1/1982 | Cuba | 56/202 |
| 4,487,007 A | * | 12/1984 | Mullet et al. | 56/16.6 |
| 4,664,403 A | * | 5/1987 | Livingston | 280/460.1 |
| 4,699,393 A | * | 10/1987 | Schweigert | 280/460.1 |
| 4,711,073 A | * | 12/1987 | Freier et al. | 56/13.3 |
| 4,761,943 A | * | 8/1988 | Parker et al. | 56/202 |
| 4,836,610 A | * | 6/1989 | Doering et al. | 298/6 |
| 4,881,362 A | * | 11/1989 | Parker et al. | 56/202 |
| 4,922,696 A | * | 5/1990 | Burns et al. | 56/202 |
| 5,080,442 A | * | 1/1992 | Doering et al. | 298/6 |
| 5,249,842 A | * | 10/1993 | Doering et al. | 298/6 |
| D378,294 S | * | 3/1997 | Barnes et al. | D15/17 |
| 5,778,648 A | * | 7/1998 | Parkes et al. | 56/202 |
| 6,591,596 B2 | * | 7/2003 | Mauzizio et al. | 56/16.6 |

\* cited by examiner

*Primary Examiner*—Árpád Fábián Kovács
(74) *Attorney, Agent, or Firm*—Hartman & Hartman, P.C.; Gary M. Hartman; Domenica N. S. Hartman

(57) ABSTRACT

A vacuum system adapted for mounting to a riding lawn mower. The vacuum system includes a blower section removably mountable to the mower deck of the mower, a unit for delivering power from a drive system on the mower deck to a propeller within the blower section, a trailer section configured for towing behind the mower, a hitch system for connecting the trailer section to the rear of the mower, and a passage connecting the blower section to the trailer section and through which debris discharged by the mower deck is propelled into the hopper. The blower section has a housing that receives debris discharged from the mower deck and a device for propelling the debris through an outlet of the housing. The hitch system permits pivoting of the trailer section about lateral and fore-aft axes of the mower but not about a vertical axis, such that the trailer section remains aligned with the fore-aft axis of the mower when the mower is turning.

20 Claims, 5 Drawing Sheets

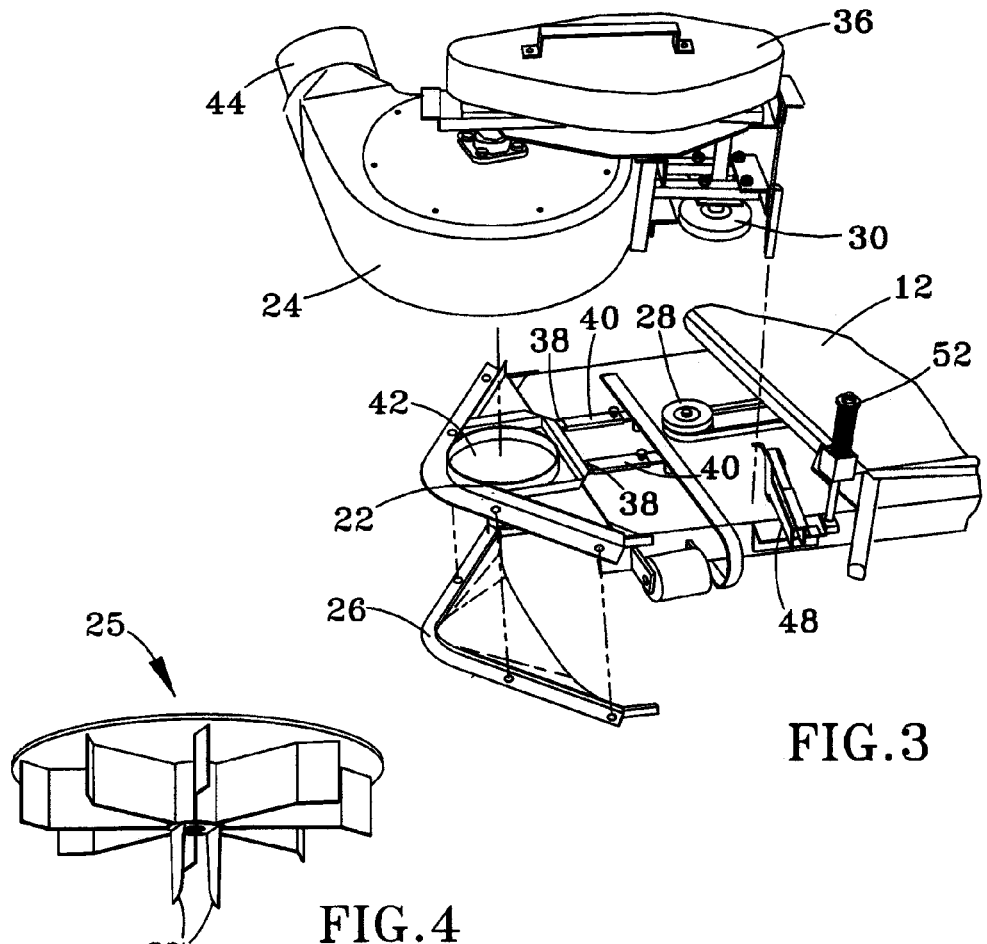
FIG.3
FIG.4
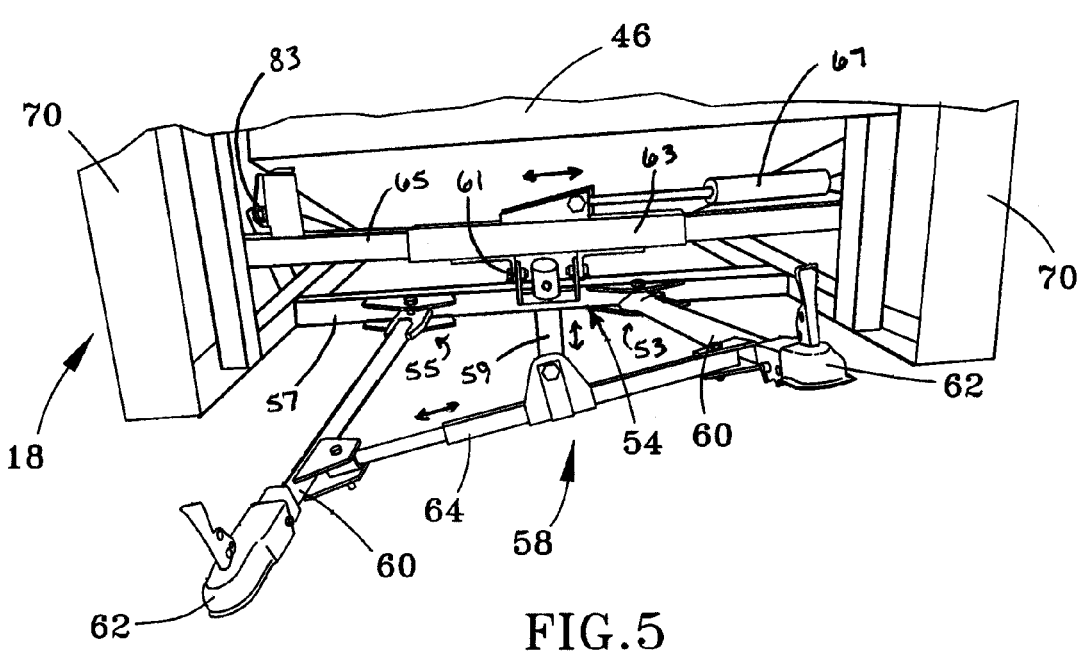
FIG.5

TRAILER SECTION PIVOTING ABOUT LATERAL AXIS AND FORE-AFT AXIS RELATIVE TO MOWER HAVING VACUUM SYSTEM

CROSS REFERENCE TO RELATED APPLICATIONS

This application is a continuation-in-part of U.S. patent application Ser. No. 10/907,785, which claims the benefit of U.S. Provisional Application No. 60/521,387, filed Apr. 15, 2004. The contents of both applications are incorporated herein by reference.

BACKGROUND OF THE INVENTION

The present invention generally relates to lawn care equipment. More particularly, this invention relates to a vacuum system adapted for use with a riding lawn mower and a riding lawn more equipped therewith.

Various leaf vacuum systems are known, including U.S. Pat. No. 3,522,695 to Musgrave, U.S. Pat. No. 3,903,565 to Hicks, U.S. Pat. No. 4,142,351 to Niece et al., U.S. Pat. No. 4,158,279 to Jackson, U.S. Pat. No. 4,310,998 to Cuba, U.S. Pat. No. 4,787,197 to Schweigert, U.S. Pat. No. 4,881,362 to Parker et al., U.S. Pat. No. 4,922,696 to Burns et al., U.S. Pat. No. 5,085,451 to Schweigert, U.S. Pat. No. 5,249,842 to Doering et al., U.S. Pat. No. 5,778,648 to Parkes et al., U.S. Pat. No. 6,308,375 to Whitney, and U.S. Design Pat. No. D378,294 to Barnes et al. Notable zero-turn mowers capable of being equipped with leaf vacuum systems include models available under the name Dixie Chopper, manufactured and sold by the Magic Circle Corporation of Coatesville, Ind. USA. Leaf vacuum systems especially adapted for Dixie Chopper mowers include the Dixie Chopper Vortex F2 and F5.

BRIEF SUMMARY OF THE INVENTION

The present invention provides a vacuum system adapted for mounting to a riding lawn mower equipped with a mower deck that encloses one or more mower blades driven by a drive system on the mower deck. The vacuum system is particularly configured for mowing and vacuuming grass clippings and leaves, but also chopping and vacuuming relatively coarser debris including twigs and branches.

The vacuum system includes a blower section removably mountable to the mower deck, a unit for delivering power from a drive system on the mower deck to a propeller within the blower section, a trailer section configured for towing behind the mower, an apparatus for removably connecting the trailer section to the rear of the mower, and a passage connecting the blower section to the trailer section and through which debris discharged by the mower deck is propelled into the hopper. The blower section comprising a housing adapted for receiving the debris discharged from the mower deck and a device for propelling the debris through an outlet of the housing. The trailer section comprises a hopper and wheels supporting the hopper, and the connecting apparatus permits pivoting of the trailer section relative to the mower about a lateral axis of the mower and a fore-aft axis of the mower but not a vertical axis of the mower, such that the trailer section remains at all times aligned with the fore-aft axis of the mower even when the mower is turning.

According to preferred aspect of the invention, the vacuum system and particularly its blower section are configured to chop and propel yard debris, such as twigs and branches. For this purpose, the propeller within the blower section preferably has a vertical axis, and the propeller is equipped with blades that extend vertically below the propeller to chop debris prior to entering the propeller. Another preferred aspect of the invention is that the blower section is powered by the mower drive of the mower through a pulley system. Furthermore, the invention is preferably configured for use with zero-turning-radius mower, and the wheels of the trailer section are castor wheels that, in cooperation with the connecting apparatus, enable the trailer section to move in a lateral direction thereof. According to yet another preferred aspect of the invention, the hopper of the trailer section is configured so that its contents can be dumped while the operator remains seated on the mower. For this purpose, substantially the entire rear wall of the hopper pivots upward and rearward through the operation of a lever that can be operated from the mower, and the entire floor of the trailer section preferably slopes rearward toward a rear access opening defined when the rear wall of the hopper is pivoted upward and rearward, such that any debris within the hopper is urged by gravity through the rear wall when open.

Other objects and advantages of this invention will be better appreciated from the following description.

BRIEF DESCRIPTION OF THE DRAWINGS

FIG. 3 is an exploded view of the blower section of FIG. 2.

FIG. 4 is an isolated view of an impeller of the blower section of FIG. 3.

FIG. 5 is a front view of a trailer section of the vacuum system of FIG. 1 (with wheels omitted for clarity) in accordance with a preferred embodiment of the invention.

DETAILED DESCRIPTION OF THE INVENTION

Figure 1:
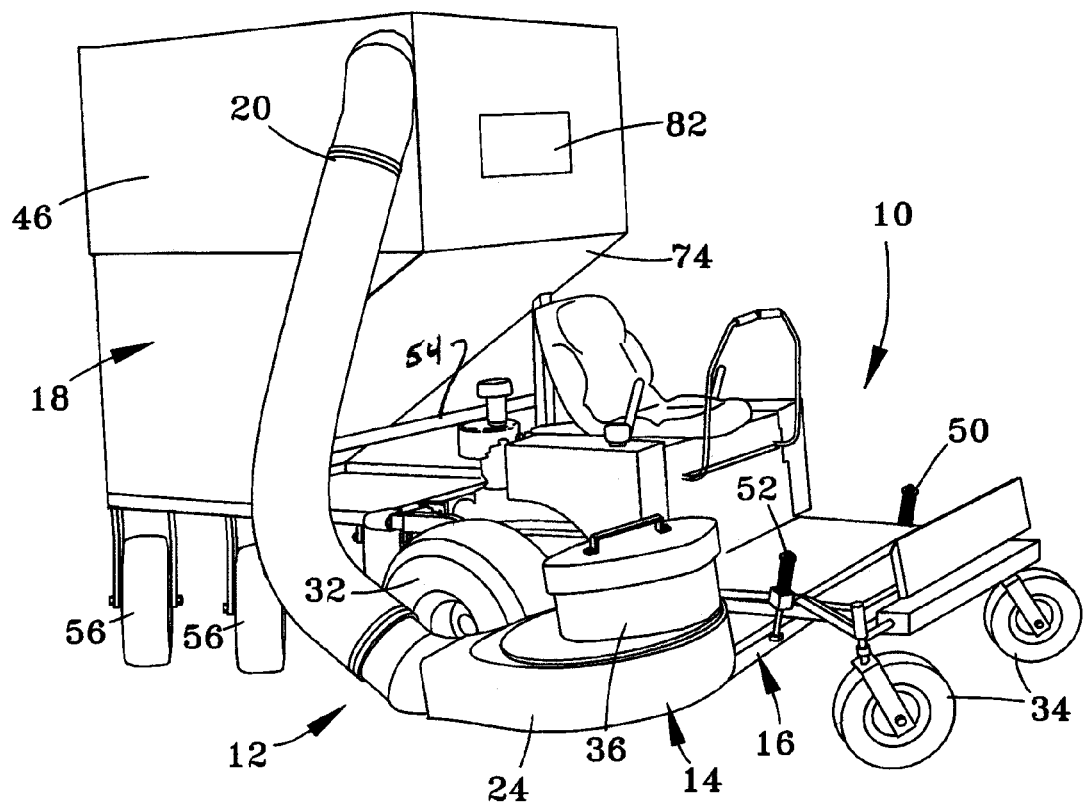
FIG. 1 depicts a zero-turning-radius riding mower modified to have a vacuum system in accordance with a preferred embodiment of this invention.

FIG. 1 depicts a zero-turning-radius riding lawn mower 10 with a vacuum system 12 in accordance with a preferred embodiment of this invention. The term "zero-turning-radius" is used herein consistent with its ordinary meaning in the art, namely, the mower 10 can be driven by its drive wheels 32 to essentially rotate about a vertical axis of the mower 10. For this purpose, the forward end of the mower 10 is equipped with castor wheels 34 that permit movement of the forward end of the mower 10 in essentially any direction, including a lateral (sideways) direction of the mower 10.

The vacuum system 12 includes a blower section 14 attached to the discharge of a mower deck 16 on the mower 10, a trailer section 18 configured for towing behind the mower 10, and a flexible chute 20 through which grass clippings, leaves, and other lawn debris discharged from the mower deck 16 travel to the trailer section 18. The mower deck 16 encloses a mower blade system (not shown) that can generally be of any suitable type, typically comprising multiple blades rotating about vertical axes and driven by a drive system (a pulley 28 and belt of which are visible in FIG. 3).

Figure 2:
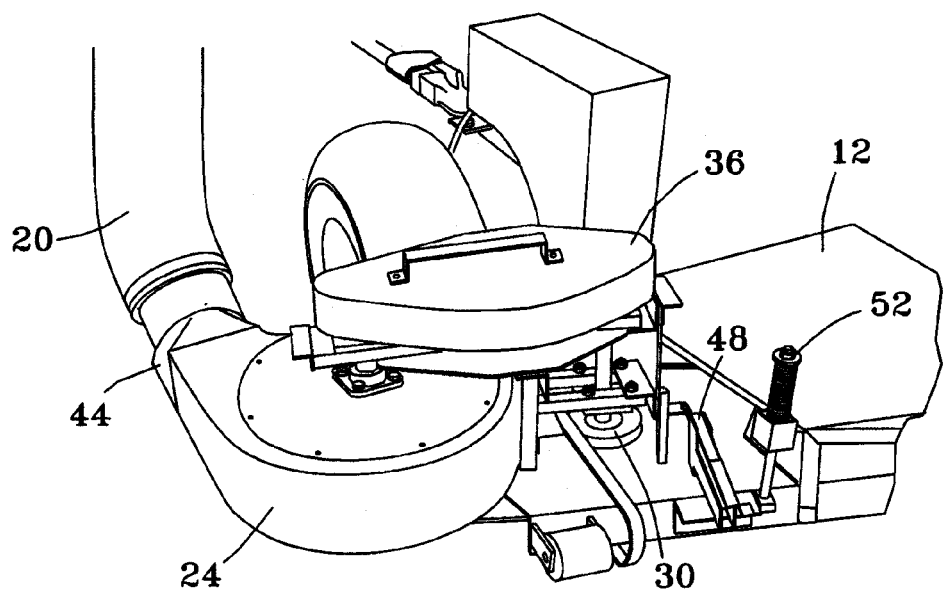
FIG. 2 is a detailed view of a blower section of the vacuum system of FIG. 1.

The blower section 14, shown in greater detail in FIGS. 2 and 3, includes a mounting frame 22 removably mounted to the discharge of the mower deck 16, a blower housing 24 attached to and supported on the frame 22, and a tray 26 attached to and supported beneath the frame 22. An impeller 25 (shown isolated in FIG. 4) is preferably housed within the blower housing 24 and is powered through a drive belt (not shown) that connects a pulley 28 of the mower drive system to a pulley 30 of a blower pulley system protectively enclosed by a cover 36. As evident from FIG. 3, the blower section 14 preferably has a modular construction in which components of the blower section 14 can be disassembled from each other and removed from the mower deck 16. The frame 22 of the blower section 14 can be seen in FIG. 3 as being mounted to the mower deck 16 with a pair of bars 38 slidably received in channels 40 on the mower deck 16. The frame 22 is formed to define an opening 42 whose axis is generally vertical. The housing 24 is removably mounted to and supported by the frame 22 above the frame opening 42, while the tray 26 is removably mounted to and beneath the frame 22 below the frame opening 42. The blower section 14 defines a passage for debris discharged from the mower deck 16. A first portion of the passage is defined by and between the frame 22 and tray 26. Farther downstream, a second portion of the passage is defined by the opening 42 in the frame 22, after which debris enters a third portion defined by the housing 24 before being discharged into the chute 20 through an outlet 44 of the housing 24. In this arrangement, debris from the mower deck 16 initially enters the blower section 14 horizontally along the tray 26, flows upward through the frame opening 42 into the housing 24 where the impeller 25 then propels the debris horizontally rearward through the outlet 44.

As evident from FIG. 1, the impeller 25 preferably has sufficient capacity to blow the debris entirely through the chute 20 and into a hopper 46 of the trailer section 18, though it is foreseeable that a supplemental blower could be mounted on the rear of the mower 10 or the front of the trailer section 18 to assist the impeller 25. To promote the operation of the vacuum system 12 in a heavily wooded area, the impeller 25 is shown in FIG. 4 as being equipped with a pair of diametrically-opposed blades 27 oriented parallel to the axis of the impeller 25 so as to extend downward through the opening 42 in the frame 22. This arrangement has been shown to improve the operation of the impeller 25 by chopping small branches that enter the blower section 14 from the mower deck 16 before encountering the impeller 25. In combination, the blades 27 and the vertical axis of the impeller 25 are believed to promote the ability of the blower section 14 to propel relatively large debris through the chute 20 to the hopper 46. The configuration of the impeller 25 itself could vary from that shown in FIG. 4, and therefore other types of impellers are within the scope of this invention, as are other devices capable of propelling debris from the blower housing 24 to the hopper 46.

As evident from FIG. 3, the tray 26 can be removed from the frame 22 to quickly provide access beneath the blower housing 24 for cleaning debris from the blower section 14 and the discharge of the mower deck 16. Furthermore, by disengaging the blower pulley system from the mower drive system with a quick-release tensioning unit 48 adapted to apply and remove the tension on the belt (not shown) connecting the pulleys 28 and 30 of these systems, the housing 24 (along with its blower pulley system and cover 36) can be removed from the frame 22.

FIGS. 1, 2 and 3 show the mower deck 16 equipped with spring-loaded couplers 50 and 52 that serve to counteract the weight of the blower section 14 on the mower deck 16. More particularly, the coupler 50 on the lefthand side of the deck 16 applies a downward force on the lefthand side of the deck 16 away from the frame of the mower 10, while the coupler 52 on the righthand side of the deck 16 applies an upward force on the righthand side of the deck 16 toward the frame of the mower 10. The couplers 50 and 52 are advantageous if retrofitting an existing mower 10 and its deck 16 with the vacuum system 12 of this invention, though it is foreseeable that such a counterbalancing system may be unnecessary for some mower and deck systems.

The hopper 46 of the trailer section 18 is mounted to a frame 54, which in turn is supported on the ground by four castor wheels 56, two to a side. The castor wheels 56 permit movement of the entire trailer section 18 in a lateral (sideways) direction thereof, which is an important capability when towed behind the zero-turn-radius mower 10. For further compatibility with the zero-turn-radius capability of the mower 10, the trailer section 18 is removably connected to the rear of the mower 10 with a hitch system 58 (FIG. 5) that permits limited pitching and rolling (pivoting) of the trailer section 18 relative to the mower 10 about a lateral (side-to-side) axis of the mower 10 and the fore-aft axis of the mower 10, but not a vertical axis of the mower 10. As depicted in FIG. 5, such a system 58 comprises a pair of hitch bars 60 coupled with articulating joints 55 to a lateral frame member 57 of the trailer frame 54, and extending roughly parallel to the fore-aft axis of the mower 10. Each hitch bar 60 terminates with a quick-connect hitch coupling 62 to permit coupling of the bars 60 to suitable features on the mower 10. As depicted, the couplings 62 are of the ball-hitch type commonly used with trailers, though other types of couplings are foreseeable. Each hitch bar 60 is connected to the trailer section 18 for articulated movement relative thereto, such that the couplings 62 can freely move in the lateral and vertical directions.

The system 58 further includes a lateral connector 64 that interconnects the hitch bars 60. As can be seen from FIG. 5, the lateral connector 64 is configured so that its length can be slidably adjusted to accommodate the attachment configurations of various different mowers 10, as well as to permit the entire trailer section 18 to be offset in either lateral direction relative to the mower 10. The lateral connector 64 is interconnected with the trailer frame 54 through a coupling that includes a vertical post 59 slidably received within an opening in a flange 61. The lateral connector 64 is pivotally coupled to the post 59 to permit pivoting of the lateral connector 64 about the fore-aft axis of the mower 10, allowing the hitch bars 60 to move in the same rotational direction about the fore-aft axis. The sliding connection of the post 59 and flange 61 permits vertical movement of the lateral connector 64 and hitch bars 60 together as a unit. The flange 61 is attached to a tube 63 slidably mounted on a second lateral frame member 65 located above and forward of the frame member 57 to which the hitch bars 60 are coupled. A cylinder 67 (e.g., electric, hydraulic, etc.) is coupled to the trailer frame 54 and the tube 63, enabling the tube 63, flange 61, post 59, lateral connector 54, and hitch bars 60 to be selectively moved in unison in either lateral direction. Such a capability is useful to provide additional clearance for the trailer section 18, for example, while mowing along a building or fence.

In view of FIG. 5 and the above discussion, the connector 64 prevents the hitch bars 60 (and therefore the entire trailer section 18) from pivoting about a vertical axis relative to the mower 10 (i.e., laterally), but permits pivoting of the hitch bars 60 (and therefore the entire trailer section 18) about the fore-aft axis of the mower 10, while the post 59 and flange 61 permit vertical movement of the trailer section 18 relative to the mower 10. The trailer section 18 thus remains at all times aligned with the fore-aft axis of the mower 10, even when the mower 10 is turning so sharply as to essentially rotate about a vertical axis.

Figure 6:
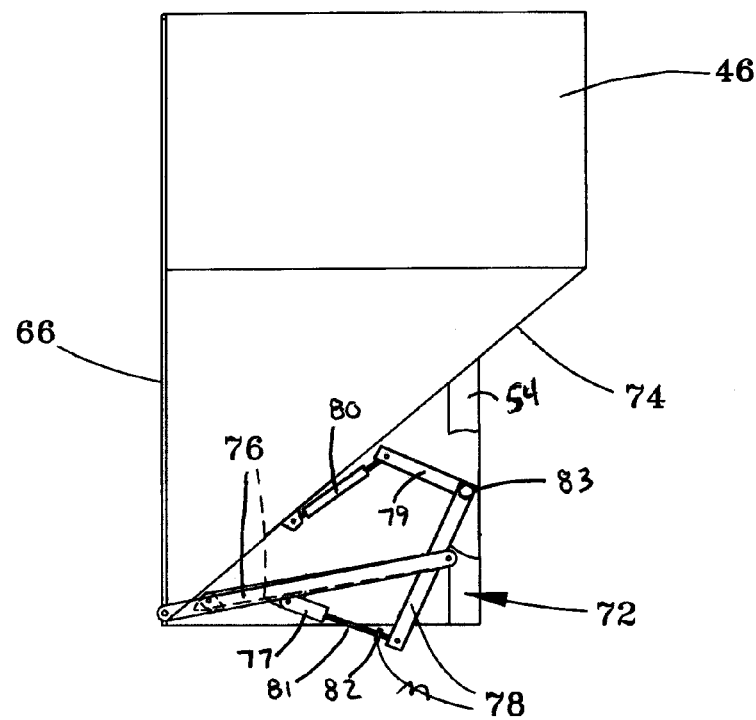
FIGS. 6 and 7 are side views of a hopper portion of the trailer section of FIGS. 1 and 5 in accordance with the preferred embodiment of the invention.
Figure 7:
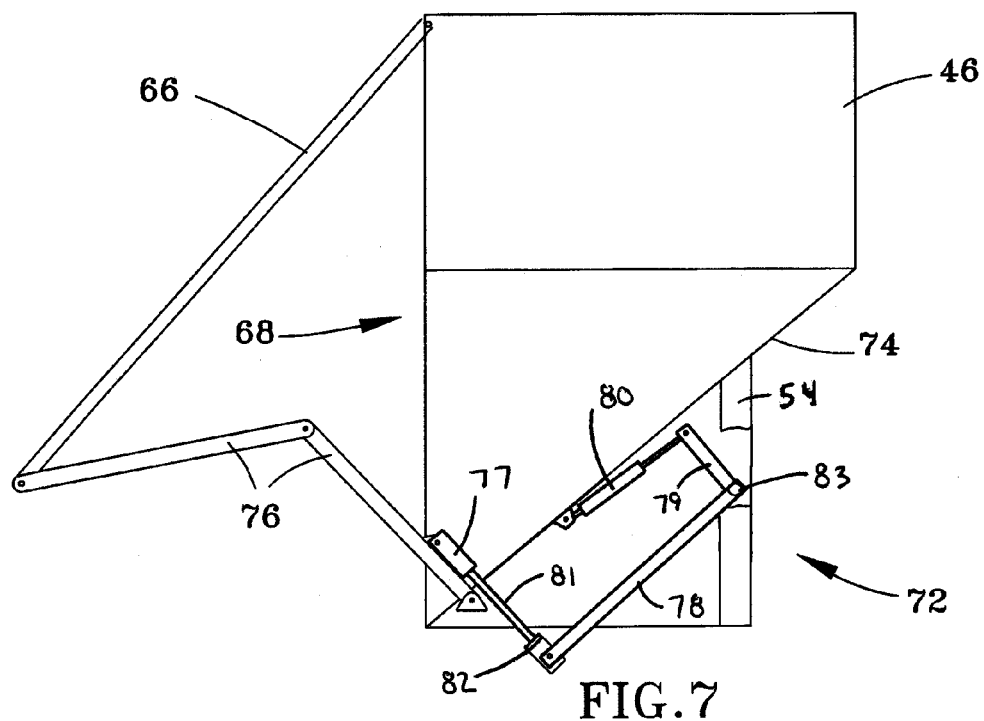

FIGS. 6 and 7 are isolated views of the hopper 46 of the trailer section 18, with protective side panels 70 (FIG. 1) removed to expose a lever system 72 adapted to permit dumping of debris collected within the hopper 46 while the operator remains seated on the mower 10. The rearmost extremity of the hopper 46 is entirely defined by a rear wall 66 that is pivotably connected to the upper extremity of the hopper 46, so that the rear wall 66 can be pivoted rearwardly and upwardly to create a rear access opening 68 to the hopper 46. As evident from FIGS. 1, 6 and 7, the entire floor 74 of the hopper 46 slopes downward toward the rear access opening 68 such that any debris within the hopper 46 is urged by gravity through the rear access opening 68 when open by the rear wall 66. The lever system 72 is mounted to the trailer section 18 and includes a pair of connected rods 76 that have a detent position corresponding to the rear access opening 68 being closed by the rear wall 66 (FIG. 6). The closed detent position in FIG. 6 is represented as being established by an over-center side-by-side alignment of the rods 76. As evident from FIGS. 6 and 7, a cylinder 80 (e.g., electric, hydraulic, etc.) operates the lever system 72 through a pair of arms 78 and 79 joined to each other and pivotally secured to the trailer frame 54 by a pivot couple 83. The distal end of the arm 78 is coupled to the more forward of the two rods 76 through a bar 77 pivotally attached to the forward rod 76 and a threaded rod 81 attached at one end to the bar 77 and pivotally attached at its opposite end to the arm 78. The length of the rod 81 can be adjusted with a threaded fitting 82 to adjust the extent to which the rear wall 66 swings away from the hopper 46. Controls for the cylinder 80 are preferably on the mower 10 to permit the operator of the mower 10 to open and close the rear access opening 68 while remaining seated on the mower 10. The operator is also able to judge the level of debris within the hopper 46 through a window 82 in a front wall of the hopper 46.

Figure 8:
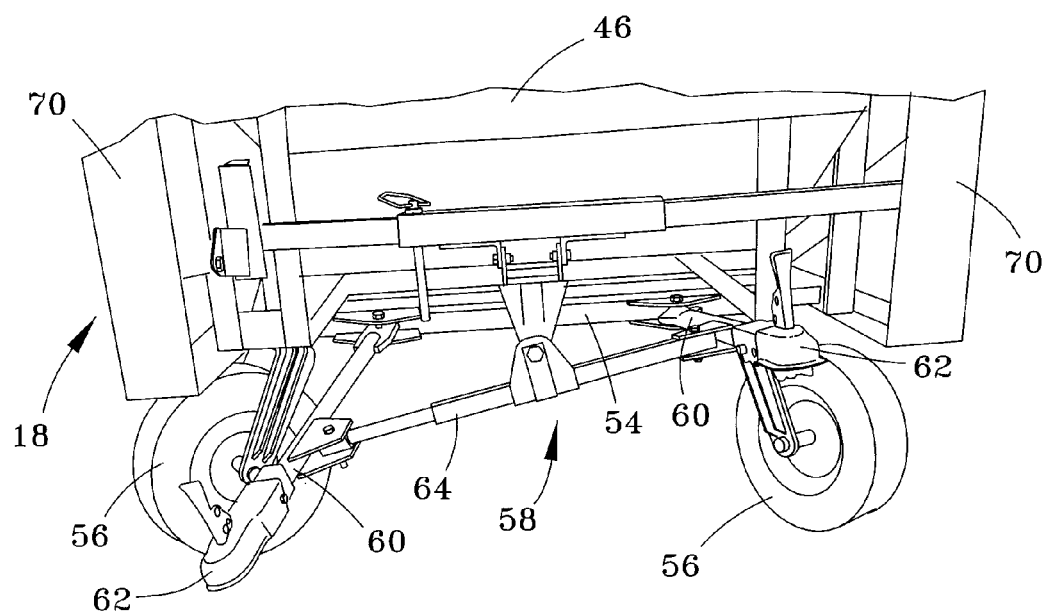
FIG. 8 is a front view of the trailer section in accordance with an alternative embodiment of the invention.
Figure 9:
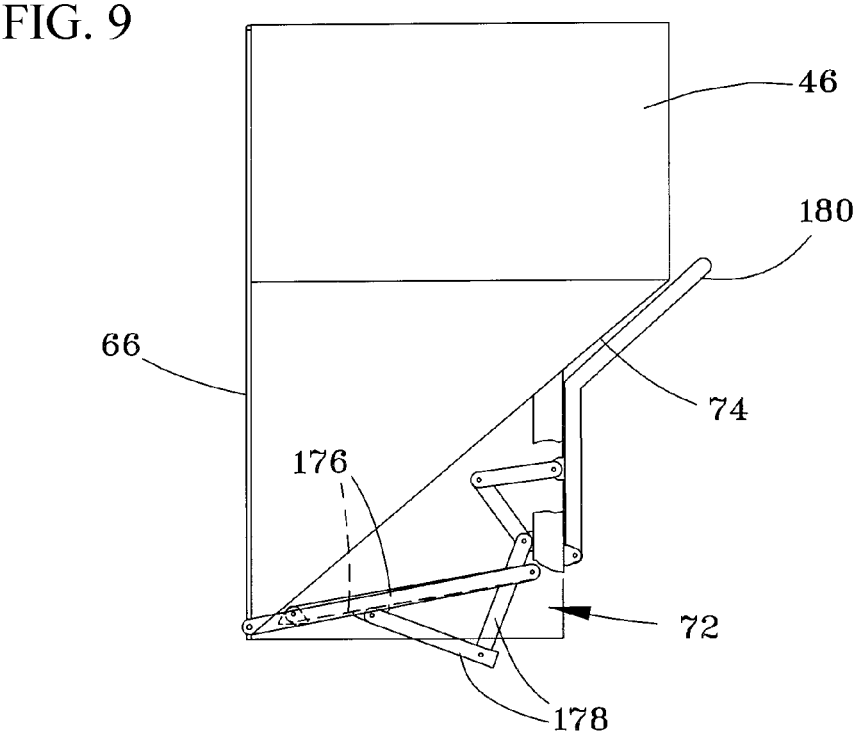
FIGS. 9 and 10 are side views of the hopper portion in accordance with an alternative embodiment of the invention.
Figure 10:
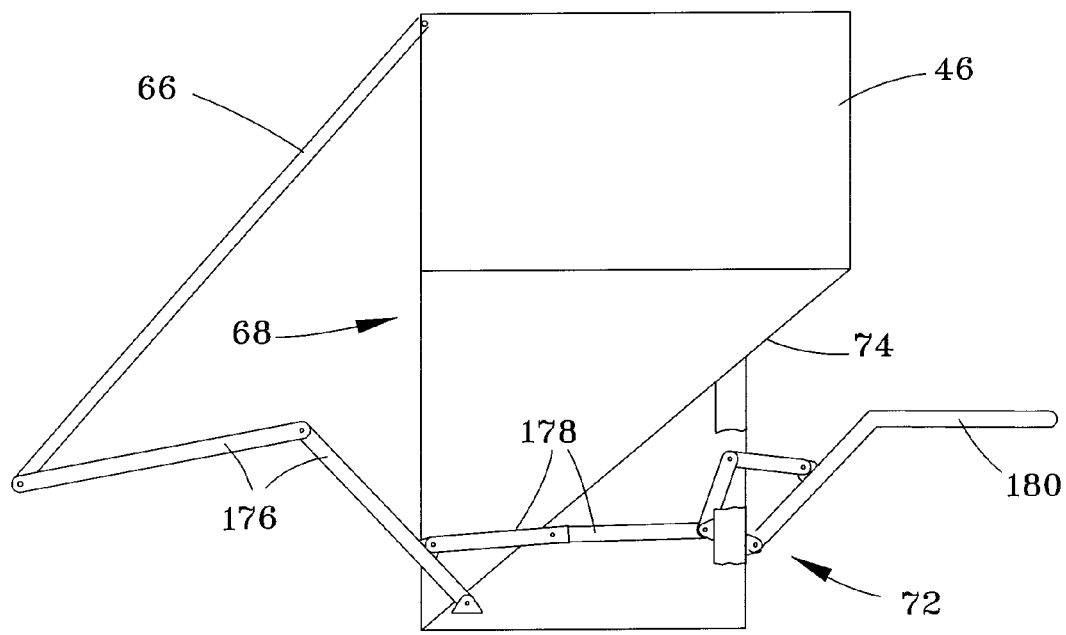

FIGS. 8, 9, and 10 depict alternative configurations for the hitch system 58 and lever system 72 of FIGS. 5, 6, and 7. In FIGS. 8, 9, and 10, consistent reference numbers are used to identify functionally similar structures, with certain components identified with a numerical prefix (1) to distinguish between the embodiments of the invention.

FIG. 8 represents the trailer section 18 as having two castor wheels 56. As with the preferred embodiment, a pair of hitch bars 60 extend substantially parallel to the fore-aft axis of the mower 10. Each hitch bar 60 terminates with a quick-connect hitch coupling 62 to permit coupling of the bar 60 to a suitable feature on the mower 10. As depicted, the couplings 62 are of the ball-hitch type commonly used with trailers, though other types of couplings are foreseeable. Each hitch bar 60 is connected to the trailer section 18 for articulated movement relative thereto, such that the couplings 62 can freely move in the lateral and vertical directions. The hitch system 58 of FIG. 8 further includes a lateral connector 64 that interconnects the hitch bars 60. The lateral connector 64 is configured so that its length can be adjusted to accommodate the attachment configurations of various different mowers 10, as well as to permit the entire trailer section 18 to be offset in either lateral direction relative to the mower 10. In contrast to the preferred embodiment, the lateral connector 64 of FIG. 8 is limited to being pivotably connected to the frame 54 of the trailer section 18, so as to limit movement of the connector 64 to a pivotal motion around the fore-aft axis of the mower 10. As a result, the connector 64 prevents the hitch bars 60 (and therefore the entire trailer section 18) from pivoting about a vertical axis (i.e., laterally relative to the trailer section 18), but permits pivoting of the hitch bars 60 in unison (and therefore the entire trailer section 18) about lateral and fore-aft axes. The trailer section 18 thus remains at all times aligned with the fore-aft axis of the mower 10, even when the mower 10 is turning so sharply as to essentially rotate about a vertical axis.

FIGS. 9 and 10 are isolated views of the hopper 46 of the trailer section 18, with the protective side panels 70 (FIG. 1) removed to expose the alternative lever system 72 of this invention, which again is adapted to permit dumping of debris collected within the hopper 46 while the operator remains seated on the mower 10. The lever system 72 is mounted to the trailer section 18 and configured to have a first detent position corresponding to the rear access opening 68 being closed by the rear wall 66 (FIG. 9) and a second detent position corresponding to the rear access opening 68 being opened by the rear wall 66. The closed detent position in FIG. 9 is represented as being established by an over-center side-by-side alignment of two rods 176, while the open detent position in FIG. 10 is represented as being established by an over-center end-to-end alignment of two rods 178. A handle 180 of the lever system 72 extends sufficiently forward from the trailer section 18 to permit the operator of the mower 10 to open and close the rear access opening 68 while remaining seated on the mower 10. The operator is also able to judge the level of debris within the hopper 46 through a window 82 in a front wall of the hopper 46.

While the invention has been described in terms of a preferred embodiment, it is apparent that other forms could be adopted by one skilled in the art. Therefore, the scope of the invention is to be limited only by the following claims.

The invention claimed is:

1. A vacuum system adapted for mounting to a riding lawn mower equipped with a mower deck enclosing at least one mower blade driven by a drive system on the mower deck, the vacuum system comprising:

a blower section removably mountable to the mower deck, the blower section comprising a housing adapted for receiving debris discharged from the mower deck and means for propelling the debris through an outlet of the housing, the propelling means having a vertical axis of rotation;

means for delivering power from the drive system on the mower deck to the propelling means of the blower section;

a trailer section configured for towing behind the riding lawn mower, the trailer section comprising a hopper and wheels supporting the hopper;

means for removably connecting the trailer section to the rear of the riding lawn mower, the connecting means permitting pivoting of the trailer section relative to the riding lawn mower about a lateral axis of the riding lawn mower and a fore-aft axis of the riding lawn mower but not a vertical axis of the riding lawn mower; and a passage connecting the housing of the blower section to the hopper of the trailer section and through which the debris propelled through the outlet of the housing enters the hopper.

2. The vacuum system according to claim 1, wherein the blower section further comprises a removable tray directly beneath the propelling means and closing a lower access of the housing, the tray being removable from the housing to permit cleaning of debris from the housing without removing the housing from the mower deck.

3. The vacuum system according to claim 1, wherein the blower section further comprises a frame removably attachable to the mower deck and supporting the housing.

4. The vacuum system according to claim 3, wherein the frame has an opening therein through which the debris discharged from the mower deck flows upward into the housing.

5. The vacuum system according to claim 4, wherein the blower section further comprises a tray mounted below the frame of the blower section, the tray being removable from the frame to permit cleaning of debris from the blower section without removing the blower section from the mower deck.

6. The vacuum system according to claim 1, wherein the propelling means comprises an impeller within the housing.

7. The vacuum system according to claim 1, further comprising blades extending downward from the propeller and operable to chop branches entering the blower section from the mower deck before encountering the propelling means.

8. The vacuum system according to claim 1, wherein the power-delivering means comprises a belt and pulley system mounted to the blower section and a quick-release means for decoupling the belt and pulley system from the mower deck.

9. The vacuum system according to claim 1, wherein the wheels of the trailer section comprise at least four castor wheels operable to permit movement of the trailer section in lateral directions thereof.

10. The vacuum system according to claim 1, wherein the connecting means comprises a pair of hitch bars extending substantially parallel to the fore-aft axis of the riding lawn mower when connecting the trailer section thereto.

11. The vacuum system according to claim 10, wherein each of the hitch bars is connected to the trailer section for articulated movement relative thereto.

12. The vacuum system according to claim 11, wherein the hitch bars are laterally spaced apart, the vacuum system further comprising:

a lateral connector pivotally interconnecting the hitch bars;

means for coupling the lateral connector to the trailer section, the coupling means enabling vertical movement of the lateral connector relative to the trailer section; and means for translating the coupling means in lateral directions of the trailer section so as to translate the lateral connector and the hitch bars together in the lateral directions of the trailer section.

13. The vacuum system according to claim 12, wherein the coupling means further enables pivoting of the lateral connector around the fore-aft axis of the riding lawn mower when the hitch bars connect the trailer section thereto.

14. The vacuum system according to claim 1, wherein a rearmost extremity of the hopper is entirely defined by a rear wall that is pivotably connected to an upper extremity of the hopper, the hopper having a rear access opening that is closed when the rear wall is in a closed position and open when the rear wall is pivoted upward and rearward relative to the hopper.

15. The vacuum system according to claim 14, wherein the hopper further comprises a floor that entirely slopes downward to the rear access opening such that any debris within the hopper is urged by gravity through the rear access opening when open by the rear wall.

16. The vacuum system according to claim 15, further comprising a lever system mounted to the trailer section and configured for opening and closing the rear wall, the lever system having a first detent position corresponding to the rear access opening being closed by the rear wall and a second detent position corresponding to the rear access opening being opened by the rear wall.

17. The vacuum system according to claim 16, wherein the lever system is actuated by a power cylinder mounted to the trailer section.

18. The vacuum system according to claim 1, wherein the vacuum system is mounted to the riding lawn mower, whereby the blower section is removably mounted to the mower deck and the trailer section is connected to the rear of the riding lawn mower with the connecting means, the vacuum system further comprising a lever system mounted to the trailer section and configured for dumping debris from the hopper of the trailer section, the lever system being operable by an operator seated on the mower.

19. The vacuum system according to claim 18, further comprising means for counteracting the weight of the blower section on the mower deck, the counteracting means comprising a first element located adjacent the blower section and urging an adjacent portion of the mower deck upward, and a second element located opposite the blower section and urging an adjacent portion of the mower deck downward.

20. A vacuum system mounted to a zero-turn-radius riding lawn mower equipped with a mower deck that encloses at least one mower blade driven by a pulley system on the mower deck, the vacuum system comprising:

a blower section removably mounted to the mower deck, the blower section comprising a mounting frame having an opening and removably mounted to the mower deck, a housing removably mounted to and supported by the mounting frame, a tray removably mounted to and beneath the mounting frame, an impeller within the housing and having a vertical axis of rotation, a belt and pulley system connected to the pulley system on the mower deck and operable to rotate the impeller when the at least one mower blade rotates, an outlet on the housing, and a passage through which debris discharged from the mower deck travels, the passage having a first portion defined by the tray, a second portion defined by the opening in the mounting frame, a third portion defined by the housing, and a fourth portion defined by the outlet;

a trailer section for towing behind the riding lawn mower, the trailer section comprising a hopper having a rear access opening, a rear wall pivotably connected to an upper extremity of the hopper for opening and closing the rear access opening, a floor of the hopper that substantially entirely slopes downward toward the rear access opening such that any debris within the hopper is urged by gravity through the rear access opening when open by the rear wall, a lever system mounted to the trailer section, configured for opening and closing the rear wall, and operable from the riding lawn mower, and castor wheels supporting the hopper such that the trailer section is capable of movement in a lateral direction thereof;

means for removably connecting the trailer section to the rear of the riding lawn mower, the connecting means permitting pivoting of the trailer section relative to the riding lawn mower about a lateral axis of the riding lawn mower and a fore-aft axis of the riding lawn mower but not a vertical axis of the riding lawn mower, the connecting means comprising a pair of articulating hitches extending substantially parallel to the fore-aft axis of the riding lawn mower and a lateral connector interconnecting the hitches and pivotably connected to the trailer section so as to be limited to pivotal motion around the fore-aft axis of the riding lawn mower; and a flexible chute connecting the outlet of the blower section to the hopper of the trailer section and through which the debris propelled through the outlet of the housing enters the hopper.

* * * * *